United States Patent Office 2,783,760
Patented Mar. 5, 1957

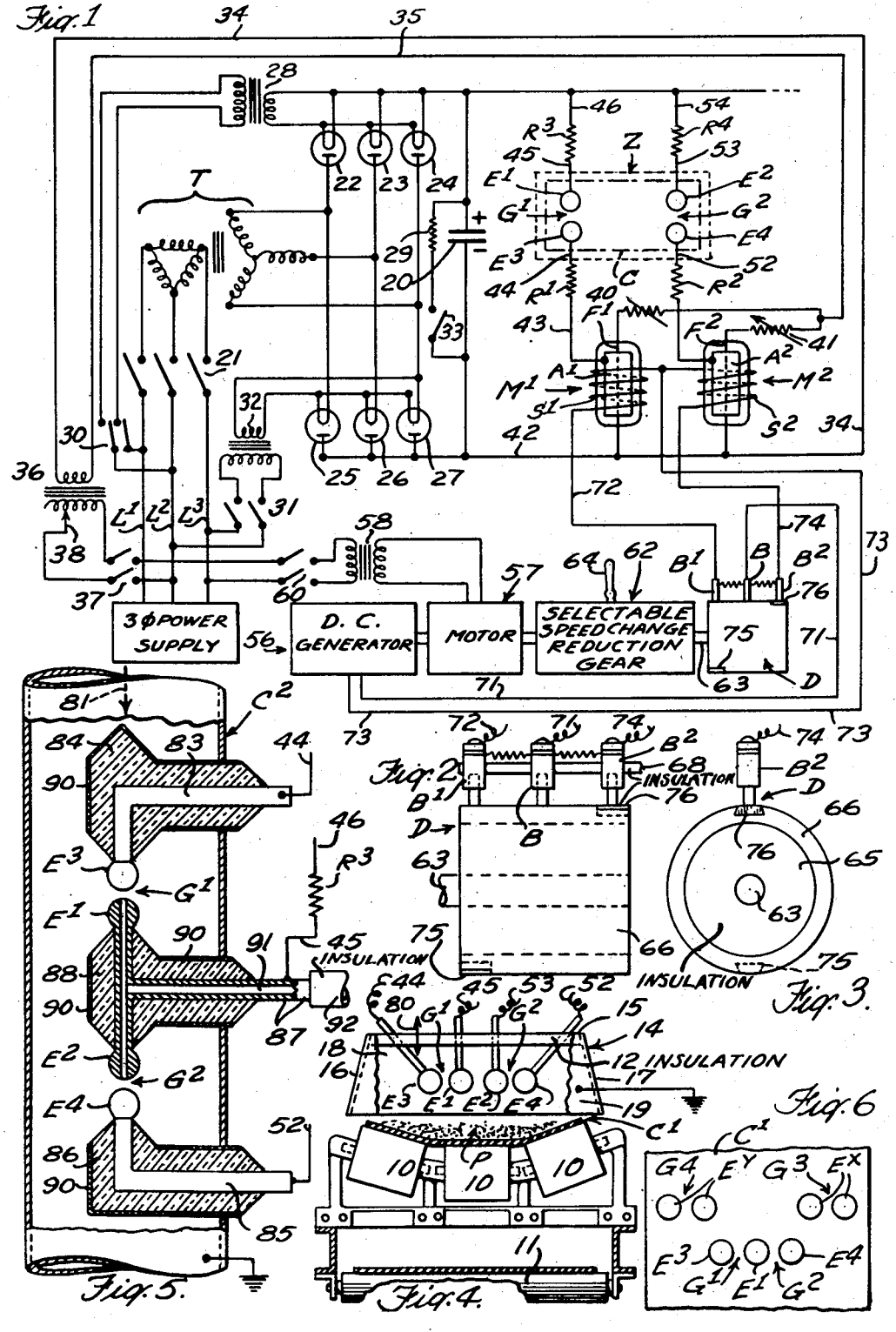

2,783,760

DESTRUCTION BY SHOCK WAVES OF INSECT LIFE IN INFESTED PRODUCTS

Franklin S. Smith, Indian Rocks Beach, Fla.

Application December 29, 1953, Serial No. 400,961

18 Claims. (Cl. 131—121)

This invention relates to a method and apparatus for treating insect-infested products by shock waves for the destruction of such insect life in its various forms or stages.

One of the objects of this invention is to provide a practical and efficient method and apparatus of the above nature that may be economically used in practice. Another object is to provide a method and apparatus of the above nature that is well adapted to meet varying or different requirements met with in practice. Another object is to provide a method and apparatus of the above nature in which the subjection to shock waves of the product may be effectively carried on in such continuity as will facilitate incorporation of the apparatus and the practice of the method into the usually continuous and substantially uninterruted flow or travel of the infested product, as in a production line or stream. Another object is to provide, in apparatus of the above-mentioned character, a shock-wave-producing and product-treatment zone or chamber capable of ready adaptability or association with the factory equipment operating in the production or processing or utilization of the product and capable of shock wave treatment of the product at a rate or capacity commensurate with that of the factory equipment. Another object is to carry out this last mentioned object by shock-wave-producing means constructed and operating so that it or multiples thereof can be dependably arranged or disposed relative to the treatment zone and more particularly relative to the characteristic of distribution or flow or travel of the product to be treated. Another object is to provide, in apparatus of the above character, ease and dependability of control of rate and intensity of shock wave production so as to readily suit the apparatus to characteristics of the product to be treated, characteristics of the treatment zone or chamber, or characteristics of the insect infestation, or the like.

The invention accordingly consists in the features of construction, combinations of elements, arrangements of parts and in the several steps and relation and order of each of the same to one or more of the others, all as will be illustratively described herein, and the scope of the application of which will be indicated in the following claims.

In the accompanying drawings in which are shown various possible embodiments of the mechanical features of my invention, Figure 1 is a representation of my apparatus for continuous treatment, by shock waves, of a product, the treatment zone or chamber being only schematically indicated and a preferred and illustrative form of electrical devices and circuit arrangements, for shock wave production in the treatment zone or chamber, being diagrammatically shown, together with certain controls therefor;

Figure 2 is a front elevation, on an enlarged scale, of a rotatable circuit-controlling device of Figure 1, showing a preferred form of construction thereof;

Figure 3 is an end elevation as seen from the right in Figure 2;

Figure 4 is a view, partly in transverse vertical section, of a treatment zone or chamber, certain parts being diagrammatically indicated, illustrating one possible form or embodiment thereof and in association with a moving product where the latter is moved by a conveyor belt; and Figure 5 is a front elevation, partly in central vertical section, of a treatment zone or chamber, certain parts being diagrammatically indicated, illustrating another possible form or embodiment thereof, as for example, for association with a conduit along and within which the product is moved, as from one part of an equipment to another or as in a factory production line.

Similar reference characters refer to similar parts throughout the several views of the drawing.

Referring first to Figure 1, the broken line box identified by the reference character Z represents schematically the treatment zone or chamber in which the product, infested with forms of insect life, is subjected to insect-life-destroying action of shock waves which are produced by means and in a manner to make practicable and efficient treatment of also "loose" products, products made up of particles or many component parts namely in bulk as distinguished from a packaged product, as well as in a manner to greatly facilitate association of the shock-wave-producing means with the path of flow or movement of such products in course of production or processing or utilization thereof, as in a production machine or as in a line of factory equipment handling such product. Without intending to limit my invention thereto, cut tobacco, such as cigarette tobacco, containing insect infestation, may be considered as such a product for purposes of an illustrative application of my method and apparatus for destruction by shock waves of forms of insect life and to illustrate ready incorporation of my method and associated means into the line of flow or movement of the cigarette tobacco in course of machine-production of cigarettes.

The manner in which the infested product is supported, or carried, or guided, by suitable means, in relation to the zone Z may vary, and in Figure 1 such means is diagrammatically indicated by the reference character C. The shock-wave-producing means comprise preferably a plurality of preferably high-intensity spark-gaps, diagrammatically indicated at $G^1$ and $G^2$ in Figure 1, with associated energizing and control means as is illustratively about to be described; they are adapted individually, upon spark-over, to produce in air a shock wave or discontinuity that travels at a velocity equal to or greater than the local sonic velocity. The term "local" sonic velocity is employed because, while the velocity of sound at sea level and under normal atmospheric pressure and at 20° C. is, as is known 1,120 feet per second, it varies primarily with change in temperature, that is, generally speaking, increase in temperature of the air increases the velocity of sound, and vice versa. These spark-gaps are preferably controlled and actuated in suitable sequence, also as is about to be illustratively described, in order to appropriately correlate distribution of life-destroying shock waves to area of exposed product or rate of movement or carriage or guidance or distribution of the product; in this latter connection, according to certain features of my invention, wide flexibility of arrangement and of functioning are possible and thus dependable life-destroying treatment of the infested product made possible and ready adaptability to varying requirements of practical use is also made possible. These spark-gaps preferably employ spherical electrodes, in pairs, as indicated in Figure 1 where two spark-gaps G¹ and G² are shown, and, upon appropriate energization, preferably at high-intensity current pulses, produce for each spark-over, of which there is one for each current pulse, a shock wave in air of high intensity, propagated at velocity in excess of the local velocity of sound; each shock wave or shock front carries or travels, with or without guidance or reflective direction, into the infested product brought into the treatment zone Z by the means C. The substantial amount of electrical energy of each spark-over between electrodes creates a severe pressure disturbance or discontinuity in the air which travels at a velocity in excess of the local velocity of sound; the shock wave thus produced is not periodic and its effects are violent because, among other reasons, the air particles are enormously accelerated. In these and other respects, it is different and distinguished from sound waves which are periodic and which always have a definite speed, namely, the speed of sound. It has been discovered that these intense shock waves in air are lethal to all forms of insect life which infest products of the above mentioned nature, such as cigarette tobacco, and accordingly when the product emerges from the treatment zone Z, it emerges with such insect life therein destroyed and can move on, as by the means C, for further processing, as by being entered directly into the cigarette-making machine, and thereby further spoilage or damage by such initial infestation prevented.

It is usual, in some cigarette-production lines or machines, to convey the mixed or blended or otherwise prepared cut cigarette tobacco conveyed thereto by means of a conveyor belt and in one illustrative embodiment of my invention I utilize that conveyor belt as the means C of Figure 1 and suitably relate thereto shock-wave-producing spark-gap means to subject the travelling tobacco to the lethal action of the shock waves, in a manner illustratively shown in Figure 4 in which is shown a conveyor belt C¹ having its upper reach carried by troughing idlers 10 and its lower or return reach carried by return idlers 11, as illustrative of such a cigarette-tobacco conveyor belt mechanism or arrangement. The conveyor belt C¹ is controllably driven in any usual manner by means not shown and on its upper troughed reach it supports the cigarette tobacco P usually more or less uniformly distributed thereon both crosswise and lengthwise of the belt for effecting, for a given rate of drive of the belt, more or less uniform rate of supply of tobacco to and for the cigarette-making or other processing mechanism.

At a suitable location lengthwise of the carrier C¹, I provide a suitable number of shock-wave-producing spark-gaps, utilizing preferably spherical electrodes, and arrange them in overlying and spaced relation to the conveyor belt C¹ and the layer of product P carried thereby, by insulatingly supporting them by any suitable insulators or insulating support diagrammatically indicated at 12; the insulating means 12 may have associated with it a housing-like structure diagrammatically indicated at 14, preferably of conductive material such as sheet metal, being provided with a top wall 15 which can carry the insulating supports 12 and with opposed side walls 16—17 which, at their lower ends, terminate in proximity to the longitudinal side edges of the carrier belt C¹, and with opposed end walls 18—19 that extend transversely of the conveyor belt and terminate in parallel edges above the conveyor belt. The structure 14, being thus given a somewhat hood-like form with the spark-gap electrodes projecting downwardly into it from its top wall 15, forms with the moving conveyor belt C¹ a treatment chamber or zone in which the continuously moving tobacco P is subjected to the insect-life-destroying action of the shock waves which are produced by and propagated from the spark-gaps in a repetitive and preferably also successive or sequential manner about to be described.

As above noted I preferably employ a plurality of spark-gaps and to simplify the drawing and explanation of these features of my invention, I have shown in Figure 1 two spark-gaps G¹ and G² with an energizing and control system therefor which illustrates how two or more shock-wave-producing spark-gaps may be related to the particular characteristics of the means C of Figure 1 and the product distribution thereon or movement thereby, together with correlated sequential energization thereof for sequential shock wave production. For example, let it be assumed that, in connection with the above described treatment zone of Figure 4 utilizing the conveyor belt C¹, the conveyor belt is of a width in relation to the shock-wave-producing characteristics of the spark-gap employed such that it is desirable or necessary to employ two spark-gaps spaced transversely of the belt C¹, as is diagrammatically indicated in Figure 4 by the two spark-gaps G¹ and G² whose respective spherical electrodes E¹—E³ and E²—E⁴ are shown substantially aligned transversely of the conveyor belt C¹ so that spark-gap G¹ more or less overlies the left half of the belt and spark-gap G² more or less overlies the right half of the belt. Were the conveyor belt C¹ to be wider than that assumed in the illustration, more than two spark-gaps would be so aligned transversely of the belt as will now be clear. Accordingly where more than one shock-wave-producing spark-gap is employed in order to adequately cover the width of the belt and the width of the spread of the product P thereon, I preferably arrange for the sequential energization of these spark-gaps in direction transversely of the belt and such energization I can adequately illustrate by the use of two transversely disposed spark-gaps as in Figure 4.

As a source of energy to effect appropriate intense spark discharge between the electrodes of the spark-gaps to produce intense shock waves in air at the spark-gaps, I prefer to employ a condenser 20 of suitable capacity and voltage to effect suitably intense spark discharge across the spark-gap or spark-gaps preferably by way of controls later described; the condenser 20 is connected to a suitable source of high voltage unidirectional electrical energy for charging it, and in Figure 1 an illustrative arrangement for charging the condenser is shown. Thus, I may utilize, a source of 3-phase alternating current energy such as a factory 3-phase power line indicated by the reference characters L¹, L², and L³ and by way of a switch 21 I may connect thereto the low voltage or primary windings of a step-up transformer generally indicated by the reference character T; transformer T may be of any suitable iron core construction and illustratively its primary windings may be delta-connected and its secondary or high voltage windings may be star-connected, as indicated in Figure 1. Its high voltage output is rectified by any suitable means for unidirectionally charging the condenser 20 and in Figure 1 I have shown a conventional full-wave rectifier arrangement comprising suitable electronic conduction tubes, such as kenotrons 22—23—24 and 25—26—27, interposed between the transformer secondary windings and the condenser 20. The filaments of kenotrons 22—23—24 are energized at suitable low voltage from a phase of the supply circuit L¹, L², L³, through an insulating step-down transformer 28, with a switch 30 interposed between the transformer 28 and the power supply line. In similar manner the filaments of kenotrons 25—26—27 are supplied with heating current from a phase of the 3-phase power supply line, through a switch 31 and an insulating step-down transformer 32. With the resultant circuit connections and arrangement the capacitor 20 is charged unidirectionally to substantially the full secondary voltage of transformer T; illustratively, that may be a voltage on the order of magnitude, of said 40,000 volts.

The several shock-wave-producing spark-gaps, illustratively the two spark-gaps G¹ and G², I connect in parallel, through suitable resistances, to the condenser 20 but with the circuit of each spark-gap individually controlled, each preferably by an electronic conduction device of controllable conductivity by a suitable control element, such as a magnetron in which conductivity between its cylindrical anode and coaxial filament or cathode is controllable, as is known, by the intensity of the magnetic field of a coaxial solenoid winding. Accordingly, where there are two spark-gaps $G^1$ and $G^2$ as in Figure 1, I employ two magnetrons generally indicated by the reference characters $M^1$ and $M^2$, one for each of the spark-gaps.

I provide suitable means for heating the filament cathodes of the magnetrons $M^1$ and $M^2$ at suitable low voltage; for example, their respective filaments $F^1$ and $F^2$ are connected in parallel as shown, to the low voltage winding, by conductors 34—35, of an insulating step-down transformer 36 whose primary winding is connected through a switch 37 to one phase of the power supply line $L^1$, $L^2$, $L^3$. Any suitable means may be employed to vary at will the energizing current supplied to the magnetron filaments, such as suitable taps 38 associated with a winding of the transformer 36 or, by way of further illustration, by individual variable resistances 40 and 41 in the respective parallel circuits of the filaments $F^1$ and $F^2$. By conductor 42 the filament cathodes of the several magnetrons are connected to the negative side of the condenser 20.

The anode $A^1$ of magnetron $M^1$ is connected by conductor 43 and a resistor $R^1$ and conductor 44 to the negative sphere electrode $E^3$ of spark-gap $G^1$; the positive sphere electrode $E^1$ of the latter is connected by conductor 45 and resistor $R^3$ and conductor 46 to the positive side of condenser 20.

In similar manner, the shock-wave-producing spark-gap $G^2$ has interposed between it and the condenser 20 the conductively controllable valve elements of magnetron $M^2$; with filament $F^2$ of the latter connected by conductor 42 to the negative side of condenser 20, the anode $A^2$ of magnetron $M^2$ is connected by conductor 51 and resistor $R^2$ and conductor 52 to the negative sphere electrode $E^4$ of the spark-gap $G^2$ of which the positive sphere electrode $E^2$ is connected by conductor 53 and resistor $R^4$ and conductor 54 to the positive side of the capacitor 20.

The electromagnetic or solenoid windings of magnetrons $M^1$ and $M^2$ are diagrammatically indicated at $S^1$ and $S^2$ respectively and, according to certain features of my invention, these I arrange for sequentially controlled energization for corresponding sequential activation, by condenser discharge, of the spark-gaps $G^1$ and $G^2$. These solenoids are energized by unidirectional current and when each produces a magnetic field above the critical value for the magnetron construction, conductivity between cathode and anode is substantially reduced to zero and current in the high voltage spark-gap circuit cannot flow; when the magnetic field of the solenoid winding is reduced to a value below the critical value of the magnetron, conductivity between cathode and anode is restored or permitted to take place and current flow in the corresponding high voltage spark-gap circuit takes place. I provide a suitable source of relatively low voltage direct current, such as a direct current generator 56 which is driven from any suitable source of power such as preferably a synchronous motor 57 which is supplied with alternating current energy from the power supply line $L^1$, $L^2$, $L^3$, preferably through a single-phase insulating transformer 58 connected, through a switch 60, to one phase of the power supply line. The drive of D. C. generator 56 may thus be advantageously at constant speed and motor 57 can thus also provide a uniform rate of drive for a timer-distributor generally indicated by the reference character D by which energization of the magnetron solenoids is controlled. Conveniently, motor 57 may be provided with any suitable form of built-in speed-reduction gear, diagrammatically indicated at 62, so that the shaft 63 of the timer-distributor D drives the latter at suitable low speed and preferably the reduction gear 62 is selectably variable or changeable so that anyone of a suitable range of low speeds of drive of the timer-distributor D may be selected, as by a speed-ratio selector diagrammatically indicated at 64.

An illustrative construction of timer-distributor may comprise a cylindrical hub or support 65 made of suitable solid dielectric material and adapted in any suitable way to be coaxially mounted and secured to the drive shaft 63; this insulating hub 65 carries, on its external cylindrical surface, a conductive sleeve 66 securely affixed thereto, as by a shrink-fit or otherwise, and it presents an external cylindrical surface with which a suitable number of current-interrupters and external stationary brushes coact, according to the number of shock-wave-producing spark-gaps that are to be sequentially activated through a corresponding number of electronic valves such as the magnetrons above mentioned.

Accordingly, and by way of the above illustration employing two shock-wave-producing spark-gaps and two magnetrons, I provide two brushes $B^1$ and $B^2$, one for each of the two magnetrons $M^1$ and $M^2$, and they, together with a third brush B are insulatingly supported, through their conductive brush-holders (see Figures 2 and 3), by any suitable form of insulating support diagrammatically indicated at 68. These brushes may be aligned parallel to the axis of rotation of the conductive sleeve 66 and are spaced axially therealong so that, as the timer-distributor element rotates, the brushes engage with different peripheral regions of the sleeve 66. The middle brush B is connected by conductor 71 (Figure 1) to one terminal of the D. C. generator 56. Brush $B^1$ is connected by conductor 72 to one terminal of solenoid $S^1$ of magnetron $M^1$ and conductor 73 connects the other terminal of winding $S^1$ to the other terminal of D. C. generator 56. Conductor 74 connects brush $B^2$ to one end of solenoid $S^2$ of magnetron $M^2$ and the other terminal of winding $S^2$ is connected by conductor 73 to the other terminal of the generator 56.

The contactor sleeve 66 is provided with two current interrupters 75 and 76 made of suitable solid dielectric material and they are spaced 180° apart (see Figure 3) and are axially displaced (see Figure 2) for coaction respectively with the brushes $B^1$ and $B^2$; conveniently they are in the form of blocks of insulating material of trapezoidal cross-section as shown in Figure 3 and fitted and securely held in slots, in the contactor sleeve 66, of substantially corresponding cross-section. Relative to the brushes with which they respectively coact, each presents a peripheral face, of the same radius as the outside radius of contactor sleeve 66, that is of greater dimension in both axial and peripheral direction (see Figures 2 and 3) than is the contacting face of the brush.

Brushes $B^1$ and B are bridged by a resistor $R^5$ and brushes $B^2$ and B are bridged by a resistor $R^6$. Accordingly, as the timer-distributor D is driven at the selected speed, the magnetrons are made to become conductive in succession and at the selected or desired rate of succession, thereby correspondingly effecting discharges of intense current pulses from the condenser 20 successively through or across the spark-gaps and where two spark-gaps and two magnetrons are so employed the shock-wave-producing spark discharges across the spark-gaps $G^1$ and $G^2$ occur alternately, that is, in the order $G^1$, $G^2$, $G^1$, $G^2$, $G^1$, etc. It will now be clear that, where more than two such spark-gaps and corresponding magnetrons are employed, illustratively three, the shock wave production, by the respective spark discharges, occurs in repeated sequences or successions as for example in the order $G^1$, $G^2$, X, $G^1$, $G^2$, X, $G^1$, etc., where X is the added spark-gap to make the three; in such case the timer-distributor D is provided with an additional brush and resistor and with an additional current interrupter element, and the resultant three-current-interrupter elements are peripherally distributed in the contactor sleeve 66 equiangularly and hence at intervals of 120°.

The resistors $R^5$ and $R^6$, conveniently connected to the brushes as shown in Figure 2, are alternately cut into and cut out of the circuits of the respective magnetron windings $S^1$ and $S^2$ in order, as will now be clear, to change the magnetic fields of the latter from above the critical value to below the critical value and vice versa. In the position of the parts shown in Figures 1 and 2 resistor $R^5$ is virtually short-circuited, through brush B, contactor sleeve 66 and brush $B^1$ and the magnetization of the solenoid $S^1$ is above the critical value and magnetron $M^1$ is non-conductive in the circuit of spark-gap $G^1$; on the other hand resistor $R^6$, for such time interval as the non-conductive piece or current interrupter 76 is in the contact with brush $B^2$, is in the circuit of solenoid winding $S^2$ so that the magnetic field of the latter is below the critical value and magnetron $M^2$ is conductive for and during the corresponding time interval, for current-pulse discharge from condenser 20 across spark-gap $G^2$. When the timer-distributor occupies a position 180° displaced from that shown in Figures 2 and 3, current interrupter 75 is contacted by brush $B^1$, resistor $R^5$ is in the solenoid circuit of magnetron $M^1$ so that the latter is conductive for current pulse discharge from condenser 20 across spark-gap $G^1$, and resistor $R^6$ is cut out of the circuit of solenoid winding $S^2$ so that magnetron $M^2$ is non-conductive and condenser discharge across spark-gap $G^2$ can not take place.

Accordingly it will be seen that by such illustrative means as above described, the current pulses through each magnetron and hence across each spark-gap are readily fixed to desired values as to pulse period and duration of pulse. By pulse period is meant the time from one point on a current pulse to the corresponding point on a succeeding current pulse, and thereby the number of shock-wave-producing current pulses, per second, across each spark-gap determined. For each spark-gap the pulse period may be varied by changing the speed of drive of the timer-distributor or by changing the number of current interrupters associated with each magnetron-allocated brush while maintaining appropriate phase displacement between the current interrupters coacting with one brush and those coacting with the others. The duration of the pulse is fixed by the time during which the current across each spark-gap is maintained at its maximum value and that is determined by the relative dimensions of the brushes and coacting current interrupters together with the rate of rotary movement of the interrupter elements, for thereby is determined the time interval during which the energization of the magnetron solenoid is held at a value of maximum conductivity of the magnetron, exclusive of current build-up and current decay time intervals. These factors, together with suitable current carrying capacity of the magnetrons employed for working filament-temperatures of the latter, are thus readily suited or fixed for shock-wave-producing spark discharge at the spark-gaps, in desired sequences such as those illustratively above described. At each spark-over, substantial energy is converted into a shock wave or shock front, producing a pressure discontinuity in air that is of high energy content and that is propagated at a velocity greater than the local velocity of sound; with very high energy input into the spark, its velocity may be several times as great as the local velocity of sound and this effect may be accentuated by high rate of energy input into the spark. These shock waves radiate out through an angle of 360° from the path of the intense current pulses across the gap between the electrodes and in radiating out the most intense shock waves move outwardly in a direction non-parallel to the path of the intense current pulses across the gap. It is known that high-intensity sparks are very efficient energy converters in that only a few percent of the electrical energy appears in the form of light and the rest appears essentially as a single pressure pulse in air that is propagated at a velocity greater than the local velocity of sound.

It is such shock waves to which the cigarette tobacco P (see Figure 4) is subjected as it is moved underneath and past the several spark-gaps such as the spark-gaps $G^1$ and $G^2$ which, as a unit, may be adjusted toward or away from the moving product P, by any suitable means which are diagrammatically indicated simply by double-headed arrow 80, as by vertical adjustment of the insulating support 12 relative to the hood structure 14, according to such variables as the thickness or depth of the layer of product P, the rate of travel thereof, the intensity or strength or range of shock-waves produced at the spark-gaps, or the like, appropriate for providing lethal effect upon the forms of insect life with which the product may be infested. By arranging several spark-gaps transversely of the conveyor belt $C^1$ and energizing them in repeated sequences such as those above described, particularly in relation to the travel of the product P as it is moved by the conveyor belt $C^1$, the scope or effective range of the shock waves is readily accommodated to the transverse dimension of the area of distribution of the product P and, in the illustration of Figure 4, to the width of the conveyor belt $C^1$. In like manner shock-wave-producing spark-gaps may be grouped in any other suitable manner relative to the area of distribution of the product or its manner or rate of movement, and the corresponding plurality of spark-gaps successively energized in any suitable sequence of any suitable geometric pattern. For example several aligned shock-wave-producing spark-gaps may be set at a diagonal relative to the pattern of distribution or direction of movement of the product. Or they may be grouped or aligned in the direction of the length of the pattern of distribution or in the direction of travel of the moving product. Thus, though what may be termed the target area covered by the high-pressure high-velocity pulse or shock wave may be less than the area, or less than a dimension of that area, of exposure of the insect-infested product, I am enabled by suitable relative disposition of a plurality of shock-wave-producing spark-gaps and by successively or sequentially energizing them, each at the same pulse period, to effect over-lapping of the individual target areas and thus cover the larger area or larger dimension of the distributed product, and where the product is made to move or travel, illustratively as by the conveyor belt $C^1$ of Figure 4, the resultant movement of the product relative to the geometric pattern in which the shock-wave-producing spark-gaps are energized in succession, each preferably several times per second, can achieve a fine gradation of over-lapping of shock wave target areas so that each unit volume of the distributed product and the insect infestation therein is thoroughly and repeatedly treated. These actions may also be aided by possible guidance, as by reflection from the walls of the treatment chamber, of the shock waves or components thereof.

As earlier above indicated the treatment zone or chamber Z of Figure 1, together with the means indicated diagrammatically at C in Figure 1 and by which the infested product is supported or carried or guided, all in relation to the shock-wave-producing spark-gap or spark-gaps, may take any suitable form or forms for practicing my invention according to the principles herein disclosed, and the arrangement shown in Figure 4 and also described above is intended to illustrate one form or embodiment of mechanical features which may be employed in practicing my invention, as for carrying out the method thereof for destroying, by shock waves in air, insect infestation in various products. Other mechanical embodiments of mechanical features may be employed in practicing my method and for purposes of illustration the treatment chamber or zone Z and the means C of Figure 1 may be embodied in a form such as that shown in Figure 5 in which the element C² represents a pipe or conduit such as might be used in guiding or moving the product from one factory machine to another or from one part of a machine to another part thereof or whereby the product to be treated is directly passed on for further processing, such as in the feeding of mixed or blended or otherwise prepared cigarette tobacco to the cigarette-making machine or machines, and for purposes of illustration the pipe C² of Figure 5 may be considered as a vertical pipe for gravity feed of the product which is not indicated in Figure 5 except as the arrow 81 indicates direction of movement thereof.

In the pipe C² I mount and align in the direction of product travel the plurality of spark-gaps, illustratively 2 in number, being the spark-gaps G¹ and G² of Figure 1 and comprising the respective spherical electrodes E³—E¹ and E²—E⁴; as indicated in Figure 5 the several spark-gaps and their sphere electrodes are aligned on the axis of the feed pipe C², so that the high-pressure high velocity pulses in air, or shock waves, will have relatively uniform distribution of propagation relative to the circular cross-section of the conduit passage along which the product falls or moves, in the direction of arrow 81, in more or less uniformly distributed manner.

The conduit C² is preferably of metal and is preferably grounded as indicated. The several spark-gap electrodes are supported therein so as to be insulated from the pipe and also to insulate from each other the respective electrodes of the several spark-gaps employed.

Thus, sphere electrode E³ may be integrally formed with a conductive L-shaped shank 83 surrounded, except for the sphere electrode itself and a terminal-connecting end of the shank, by a suitable insulating medium such as the insulator 84 made of solid dielectric material molded thereabout to appropriate thickness and external conformation, substantially as shown in Figure 5, whereby it is also insulatingly supported in a suitable aperture in the wall of the pipe. In substantially similar manner electrode E⁴ has an L-shaped conductive shank 85 insulated and supported, in a wall aperture, by insulator 86. Sphere electrodes E¹ and E² can be formed at the respective ends of a T-shaped conductive shank 87 which is surrounded and insulated by the molded insulator 88, for mounting in a wall aperture, substantially as shown. The electrical connections of the terminal-connector ends of the shanks 83, 87 and 85 to bring the spark-gaps G¹ and G² into the circuit and control arrangement of Figure 1 are as diagrammatically indicated in Figure 5, namely, conductor 44 of Figure 1 is connected to shank 83 of electrode E³ of spark-gap G¹ and conductor 52 of Figure 1 is connected to shank 85 of electrode E⁴ of spark-gap G² and, since their respective companion electrodes E¹ and E² are electrically and physically integral with shank 87 of Figure 5, only one of the connecting conductors 45 and 53 of Figure 1 need be employed and accordingly, in Figure 5, I have shown conductor 45 connected to electrode shank 87 along with resistor R³ which, because of the successive or sequential energization of the spark-gaps G¹ and G², can serve for both spark-gap circuits.

The shock-wave-producing spark-gaps G¹ and G² of Figure 5 are thus energizable in repeated sequences such as G¹, G², G¹, G², etc., resulting in a pattern of shock wave production aligned generally along the direction of travel or falling or moving of product, and achieving repetitive overlapping of shock wave effects lengthwise of the direction of travel of the product as it passes through the region adjacent and about the first spark-gap, being spark-gap G¹ in Figure 5, and as it passes through the region adjacent and about the second spark-gap, being spark-gap G² in Figure 5. Moreover, the conduit or pipe C² can act as a guide for the shock waves, leading or guiding them lengthwise of and along the interior of the tube or pipe C² and the interior walls of the latter may also coact by reflective action on the shock waves; in this manner also, the shock wave effects may be guided or distributed both lengthwise of the pipe C² and throughout the internal cross-section thereof, it being that cross-section that is traversed lengthwise of the pipe C² by the moving product.

I prefer to make suitable provision for preventing particles of the product from getting into the spark-gap and the immediate region of spark-over; for example, I may make the T-shaped shank 87 that carries the electrodes E¹ and E² tubular in form, as indicated at 91 in Figure 5, extending the resultant passageways through the electrodes E¹ and E² to provide in the latter discharge openings directed toward the respective companion electrodes E³ and E⁴, and supply the tube-passages, as by a hose 92 of insulating material connected to the terminal end of shank 87, with low pressure compressed air from any suitable source, insulating hose 92 being of appropriate length in relation to the operating voltages employed. Each electrode E¹ and E² is thus made to emit a steady flow of air directed toward and against its companion electrode with the effect that, aided by the expansion and dispersion of the emitted air, each spark-gap is kept free and clear of product particles and the latter are kept out of and away from the spark-over and the immediate spark-over region between the active electrodes. Pressure and rate of this air flow into the spark-gap regions are of course held at values insufficient to detrimentally interfere with suitably free movement or flow of the product particles along the pipe C² and past and about the insulator structures of the electrodes.

These insulator structures 84—88 and 86 are preferably metal-covered or metal-coated, as by any suitable metal spraying or surface-metalizing process, throughout their external surfaces as indicated at 90 in Figure 5, leaving uncoated only the relatively small insulating areas of each insulator immediately adjacent and about the protruding sphere electrode and also similar areas, externally of the pipe C², adjacent and about the terminal connector ends of the respective shanks. The metal coating of each insulator is in electrical connection with the grounded metal pipe C² at the places where the several insulators are fitted and secured in the respective round apertures in the wall of the pipe C²; with the conductive coatings 90 thus grounded, static charges cannot collect thereon and product particles are not attracted or adhered thereto or thereon. It will be noted, in Figure 5, that, with the just described arrangement, the uncoated areas of the insulators about the respective sphere electrodes thereof are within the immediate region of the above described emitted and expanding air supplied through the hose 92 and by the resultant motion or turbulence of such air detrimental accumulation or piling up of product particles thereon does not take place.

In the arrangement of Figure 5 the substantially total enclosure of the shock-wave-producing spark-gap or spark-gaps by the grounded metal conduit C² has the advantage of coacting as a shield to confine or trap stray fields or flux emanating from the spark discharges, where suppression thereof is desirable as for purposes of lessening or avoiding interference with radio or similar apparatus or equipment. In the arrangement of Figure 4 the hood-like structure 14 can also be made of metal and grounded as indicated and can take part in similar shielding or suppression action.

The shock-wave-producing spark-gap or spark-gaps are preferably, according to certain features of my invention, fast gaps in that spark-over is not preceded by corona and accordingly I make the electrodes spherical as above described, with appropriate spacings therebetween in relation to the sphere diameter. For example, where the voltage applied is 40,000 volts, the diameter of the sphere electrodes can be about two inches and the spacing or gap therebetween about 0.400 inch. Where the spark-gap electrodes have bare shanks, as indicated in the arrangement of Figure 4, known proportioning of shank diameters to sphere diameters is resorted to to insure that spark-over or discharge does not occur between the supporting shanks of the sphere electrodes, and the shanks of the electrodes of each gap are preferably not parallel to each other; thus as indicated in Figure 4, while the shank of electrode $E^1$ of gap $G^2$ may be supported in the insulating support 12 with its axis substantially vertical, the shank of companion electrode $E^3$ is supported so that it makes a substantial angle to the shank of electrode $E^1$, in the manner indicated in Figure 4. In similar manner the shank of electrode $E^4$ of gap $G^2$ is supported at a substantial angle to the shank of its companion electrode $E^2$. Such arrangement, where the sphere electrodes have bare shanks, co-acts to prevent corona discharge preceding the spark-over. The fast gaps, upon spark-over, thus achieve sudden rupture through the air between their respective electrodes and substantially concurrent and sudden conversion of the energy of the spark-over into a discontinuity in air that emanates from the immediate region of spark-over and is propagated therefrom at high velocity, a velocity that can be several times the local velocity of sound; the fast spark-gap or gaps co-act in dependably achieving high rate of energy input into the spark, thus facilitating the production, for each spark-over, of a shock front of the desired energy content and velocity for achieving destruction of forms of insect life in the product. This velocity may be from just below sonic velocity to several times the local velocity of sound, and any suitable means may be employed to correspondingly set or adjust the electrical energy input to the spark-gap or gaps; for example, and as above already indicated, the current pulses supplied to each spark-gap may be adjusted to desired values by correspondingly setting the conductivity of the magnetrons, as by controlling filament temperature by the variable resistances 40 and 41 for the magnetrons $M^1$ and $M^2$.

As above noted, the pressure pulse or shock wave emanates from the immediate region of spark-over at a velocity that can be several times the local velocity of sound, and as it travels away from the region of spark-over where it originated, there is some loss in its velocity as its distance of travel increases but the rate of velocity diminution becomes very low as it nears the local velocity of sound. Accordingly the shock waves have substantial range before they reach sonic velocity and still greater range before they reach values just below sonic velocity, and it is within such ranges that the infested product is subjected or brought to the spark-gap or spark-gaps for destruction of the forms of insect life in the product. Desirably the infested product is brought as closely as possible to the region of spark-over to gain the benefit of the higher instantaneous values of velocity of the shock wave and of the correspondingly greater energy of impact thereof with the forms of insect life; but even where the forms of insect life in the product are encountered by shock waves, within the above-mentioned range of velocities, that are of lesser velocity of travel, there is repetitive or multiple impacting thereof by the successive shock waves produced by the succession of spark-overs, including the above described repetitive sequences of shock waves from a plurality of spark-gaps, and the resultant cumulative shock wave effects coact to produce lethal effects on the forms of insect life.

Illustratively, a fast gap with sphere electrodes about two inches in diameter, having a gap therebetween of about 0.400 inch, may be energized from a capacitor of 0.5 microfarad charged at 40,000 volts, as in the circuit Figure 1; the belt $C^1$ of Figure 4 may have a width of about 12 inches, and the conveyed product, such as moist cigarette tobacco, dried fruit such as raisins, or dried products such as dried beans, may have its particles or components spread thereon in a layer about 1 inch thick with a spacing between the supporting surface of the belt and the axis of the sphere electrodes on the order of 3 inches or so. Belt travel may be on the order of 5 inches per second and in relation thereto, as by selecting the desired speed by selector control 64 (Figure 1), the timer-distributor D may be given a speed of 2 R. P. S. which provides a pulse repetition rate of 4 per second; with a pulse duration of, say, 100 micro-seconds, pulse energy is on the order of 250 joules, and consequently energy is transformed in the gaps at the rate of about 1 kilowatt per hour. Such data as these illustrate the high order of magnitude of electrical energy that it is possible to make available, and at a high rate of input, in the spark-over for conversion into usable shock waves for lethal effects upon forms of insect life in infested products of the above-mentioned nature; it will be understood that these data are set forth only in an illustrative and not in a limiting sense. For example, electrical constants of the illustrative circuit of Figure 1 may be, in known manner, varied or changed or made variable to provide other values and rates of electrical energy input to the fast gap or gaps for the production of shock fronts or shock waves lethal to such forms of insect life. Likewise, spacings of the product from the fast-gap electrodes and depth of layer thereof on the belt may be changed as earlier above described in relation to speed of the belt and to pulse repetition to suit effective shock-wave intensity to characteristics of the product and its infestation.

As described above, Figure 4 shows a plurality of shock-wave-producing spark-gaps aligned generally crosswise of the path of travel of the product to be treated while Figure 5 shows them aligned generally lengthwise of the travel of the product, each with appropriate sequential shock-wave-producing energization of the spark-gaps. As also noted above, other geometric patterns of spark-gap arrangement for sequential shock wave production may be utilized in the practice of my invention and Figure 6 illustrates one such other arrangement diagrammatically. Also, from the above descriptions of Figures 4 and 5, it will now be apparent that, in Figure 4, electrodes $E^1$ and $E^2$ of the spark-gaps $G^1$ and $G^2$ can be connected into the circuit through a single conductor 45 as are the electrodes $E^1$ and $E^2$ of Figure 5. Also, and as shown in Figure 6, a single sphere electrode can be common to several gaps; thus electrode $E^1$ is shown as companion to electrodes $E^3$ and $E^4$ to either side of it, forming the two fast gaps $G^1$ and $G^2$ arranged transversely of the distributed product carried by belt $C^1$ and sequentially energized as described above, particularly in connection with Figure 5 so far as the circuit connections are concerned. Adjacent gaps $G^1$ and $G^2$ as in Figure 6, I may provide additional ones such as fast gaps $G^3$ and $G^4$ that comprise paired sphere electrodes $E^x$ and $E^y$, all grouped appropriately in relation to the product distribution or travel. The circuit arrangement of Figure 1, supplied with additional magnetrons for gaps $G^3$ and $G^4$, and with two additional brushes on the timer-distributor D and corresponding current-interrupters to coact therewith, the four current-interrupters being space 90°, in the manner earlier above described, can provide the desired sequence of energization of the shock-wave-producing gaps, for example, in the order $G^4$, $G^3$, $G^2$, $G^1$, $G^4$, $G^3$, etc. with a corresponding and, in this case, rotatively-travelling pattern of shock wave production relative to the product being treated.

When the apparatus is shut down, switch 33 (Figure 1) is closed to discharge capacitor 20 through a suitable resistance 29.

It will thus be seen that there has been provided in this invention a method for treating insect-infested products, such as cigarette tobacco, by shock waves for the destruction of such insect life in its various forms or stages, together with a system and apparatus for so treating such insect-infested products, all readily adaptable to meet varying practical requirements or conditions, including facility and economy of association with or incorporation into a production line or stream, or equipment or machinery operating in the latter. Moreover, it will be seen that the several objects above noted or indicated, together with many thoroughly practical advantages, are successfully achieved. The method and system are characterized by facile control and flexibility for corelating various elements and their coactions in relation to each other and to practical operating requirements, such as has been illustratively set forth above.

This application is a continuation-in-part of my application Serial No. 129,655, filed November 26, 1949, now matured as U. S. Patent No. 2,664,850 issued January 5, 1954.

As many possible embodiments may be made of the mechanical features of the above invention and as the art herein described might be varied in various parts, all without departing from the scope of the invention, it is to be understood that all matter hereinabove set forth, or shown in the accompanying drawings is to be interpreted as illustrative and not in a limiting sense.

I claim:

1. A method of destroying insect life in an infested product which comprises supplying electric current of sufficient intensity to spark-over an air gap, interrupting said current at predetermined intervals of time to generate a plurality of separate intense current pulses in the gap to form a plurality of separate shock waves in air which radiate out from the path of travel of the intense current pulses across the gap at a velocity in the range just below the local velocity of sound to several times the local velocity of sound and then moving the product in bulk in a path exterior to and not intersecting the path of the intense current pulses across the gap but intersecting the path of the shock waves radiating out from the current pulses to destroy insect life in the product.

2. A method as specified in claim 1 which includes the step of moving the product to be treated exterior to and in a direction substantially parallel to the path of the intense current pulses across the gap to intersect the shock waves radiating out from the path of the intense current pulses across the gap.

3. A method as specified in claim 1 which includes the step of supplying a stream of a gaseous medium which is directed along the path of the intense current pulses across the gap to provide a barrier substantially preventing entry of product into the path of such intense current pulses.

4. In a method of destroying forms of insect life, by shock waves, in an infested product such as cigarette tobacco, the steps which comprise converting electrical energy into a succession of shock waves in air by repeatedly energizing, at intense current pulses, a fast spark-gap to generate, at each spark-over between the electrodes thereof, and to propagate therefrom, a discontinuity in air of a velocity in the range from just below the local velocity of sound to several times the local velocity of sound, distributing the particles of the infested product on to the supporting surface of a movable carrier, and moving the supporting surface, with the product particles thereon, along a path spaced downwardly from the spark-gap by a distance not greater than the range of travel of the propagated discontinuity and greater than the depth of the product particles on the supporting surface to prevent product particles from passing into the immediate region of spark-over between the electrodes.

5. Apparatus for destroying insect life in an infested product which comprises at least two electrodes with a gap between the electrodes for spark-over, means for supplying a flow of electric current to the electrodes of sufficient intensity to spark-over the gap, means for interrupting the flow of electric current to generate a plurality of separate intense current pulses in the gap to form a succession of separate shock waves which radiate outwardly from the path of travel of the intense current pulses across the gap at a velocity in the range just below the local velocity of sound to several times the velocity of sound and means for moving infested product particles in bulk in a path exterior to and not intersecting the path of the intense current pulses across the gap but intersecting the path of the shock waves radiating out from such current pulses to destroy insect life in the product.

6. Apparatus for destroying insect life in an infested product which comprises at least two fast spark gap electrodes with a gap between the electrodes for spark-over, means for supplying electric current to the electrodes of sufficient intensity to spark over the gap, means for interrupting the flow of electric current to generate a plurality of separate intense current pulses in the gap to form a succession of separate shock waves which radiate out in non-parallel direction from the path of travel of the intense current pulses across the gap at a velocity greater than the local velocity of sound and means for moving the product in a path exterior to and in a direction substantially parallel to the path of the intense current pulses across the gap to intersect the shock waves radiating out from the path of the intense current pulses across the gap and destroy insect life in the product.

7. Apparatus as specified in claim 5 in which the means for interrupting the flow of electric current includes high voltage switching means and low voltage means operating in recurring sequence to control said high voltage switching means and means for controlling the low voltage control means to determine the rate of sequential recurrence relative to the rate of movement of the infested product along said path.

8. Apparatus for destroying insect life in an infested product which comprises means supplying electric current of sufficient intensity to spark-over an air gap, means for interrupting said current at pre-determinate intervals of time adapted to generate a plurality of separate intense current pulses in the gap to form a plurality of separate shock waves in air which radiate out from the path of travel of the intense current pulses across the gap and means for moving the product in bulk in a path exterior to and not intersecting the path of the intense current pulses across the gap, but intersecting the path of the shock waves radiating outwardly from the current pulses to destroy insect life in the product.

9. Apparatus for destroying insect life in an infested product which comprises a plurality of fast spark gap electrodes arranged in pairs with a spark gap between the two electrodes of each pair for spark-over, means for supplying electric current to the electrodes of sufficient intensity to spark-over the gaps, means for interrupting the flow of electric current to generate a plurality of separate intense current pulses across the gaps to form a plurality of separate shock waves across each gap which radiate outwardly from the path of travel of the intense current pulses across the gaps at a velocity greater than the local velocity of sound and means for moving infested product in bulk in a path exterior to and not intersecting the path of the intense current pulses across the gaps, but intersecting the path of the shock waves radiating outwardly from the current pulses to destroy insect life in the product.

10. An apparatus as specified in claim 5 in which said means for effecting movement of the particles of the infested product comprises a movable conveyor which provides a product-carrying surface spaced underneath said fast gap electrodes by a distance not greater than the range of propagation of said discontinuity propagated by said spark-over and greater than the depth of the product particles on said supporting surface for thereby preventing the path of movement of product particles from intersecting the immediate region of spark-over between said electrodes.

11. An apparatus as specified in claim 5 in which said means for effecting movement of the particles of the infested product along the aforesaid path comprises also means for supplying to the immediate spark-over region between said electrodes a stream of air the movement of which, along said region, constitutes a barrier to the entry of product particles into the immediate region of spark-over.

12. An apparatus as specified in claim 5 in which said means for effecting movement of the particles of the infested product comprises a guiding conduit for the product, with means insulatingly supporting said fast gap electrodes interiorly of said conduit and spaced from the walls thereof, means forming an air passage from the exterior of said conduit to the immediate region of spark-over between said electrodes, and means for supplying a gaseous medium under pressure to said air passage for discharge into said medium region of spark-over between said electrodes and thereby constituting a barrier against the entry of product particles into said region.

13. An apparatus as specified in claim 5 in which said means for effecting movement of the particles of the infested product comprises a guiding conduit for the product, with means insulatingly supporting said fast gap electrodes interiorly of said conduit and spaced from the walls thereof, one of said electrodes having an orifice-like discharge opening directed toward the other electrode at the region of electrical spark-over therebetween, and means for supplying a gaseous medium for discharge thereof from said discharge opening at a velocity insufficient to detrimentally affect spark-over between the electrodes and sufficient to maintain, substantially about said region of spark-over, a barrier against the entry of product particles into the spark-over region.

14. An apparatus as specified in claim 5 in which said means for effecting movement of the particles of the infested product comprises a guiding conduit for the product, with means insulatingly supporting said fast gap electrodes interiorly of said conduit and spaced from the walls thereof, and means constituting a barrier about the region of spark-over between said electrodes for preventing product particles from entering said region.

15. An apparatus as specified in claim 5 in which said means for effecting movement of the particles of the infested product comprises a guiding conduit for the product, with means insulatingly supporting said fast gap electrodes interiorly of said conduit and spaced from the walls thereof, with grounded conductive means associated with surface portions of said means for insulatingly supporting said electrodes and thereby lead off static charges which would otherwise cause product particles to adhere thereto.

16. An apparatus as specified in claim 15 in which said conduit is electrically conductive, with means for grounding it, said conductive means being in electrical connection with said conduit.

17. An apparatus as specified in claim 6 which includes insulating means for supporting said electrodes to position the electrodes with the path of spark-over in the fast spark gap generally transversely of said path of movement of the infested product particles with the effective transverse spacing between adjacent fast spark-gaps not greater than that at which the sum of the transverse dimensions of the target areas of the respective shock waves is less than the transverse dimension of the path of movement of the infested product particles.

18. An apparatus as specified in claim 6 which includes a conveyor belt for moving the particles of infested product along said path and which includes means for insulatingly supporting the electrodes of the fast gaps in distributed relation overlying the conveyor belt and supporting at least some of the fast gaps distributed generally transversely of the conveyor belt.

References Cited in the file of this patent

UNITED STATES PATENTS

| | | |
|---|---|---|
| 1,016,449 | Smith | Feb. 6, 1912 |
| 1,016,451 | Smith | Feb. 6, 1912 |
| 1,399,162 | Smith | Dec. 6, 1921 |
| 1,738,565 | Claypoole | Dec. 10, 1929 |

FOREIGN PATENTS

| | | |
|---|---|---|
| 299,847 | Great Britain | Dec. 5, 1929 |
| 474,187 | Great Britain | Oct. 27, 1937 |

OTHER REFERENCES

Carlin, B. "Ultrasonics," page 27, published 1949 by McGraw-Hill Book Co., New York.

"A Text-book of Sound" by A. B. Wood, page 218, published 1946 by Bell and Sons, Ltd., London.